United States Patent [19]
Goldhor

[11] Patent Number: 5,101,375
[45] Date of Patent: Mar. 31, 1992

[54] METHOD AND APPARATUS FOR PROVIDING BINDING AND CAPITALIZATION IN STRUCTURED REPORT GENERATION

[75] Inventor: Richard S. Goldhor, Belmont, Mass.

[73] Assignee: Kurzweil Applied Intelligence, Inc., Waltham, Mass.

[21] Appl. No.: 332,531

[22] Filed: Mar. 31, 1989

[51] Int. Cl.$^5$ .............................................. B10L 7/08
[52] U.S. Cl. .............................. 364/419; 364/DIG. 2
[58] Field of Search ............... 364/200, 900, 523, 419; 381/43, 44

[56] References Cited

U.S. PATENT DOCUMENTS

| | | | |
|---|---|---|---|
| 4,754,474 | 1/1988 | Feinson | 379/96 |
| 4,914,704 | 4/1990 | Cole et al. | 381/43 |

OTHER PUBLICATIONS

"Dictionary of Computers, Information Processing and Telecommunications", Jerry M. Rosenberg, ©1984 pp. 170, 351.

*Primary Examiner*—Dale M. Shaw
*Assistant Examiner*—Andrew Bodendorf
*Attorney, Agent, or Firm*—Henry D. Pahl, Jr.

[57] ABSTRACT

A report generation method and apparatus automatically bind and capitalize text strings provided, for example, by speech recognition systems as text to be inserted into a report form. The method and apparatus associate with each text string, text string signals representing instructions for binding and capitalizing the text strings. Spaces, if any, are then prepended to the next string in response to the text string signals and the first alphanumeric letter of the text string is capitalized in response to the text string signals. The text string signals include left and right codes or instructions describing the beginning and ending of the text material and can include either preset or machine-generated action instructions designating the binding and capitalization requirements for the text string. The apparatus and method preferably employ a look-up table for associating the binding and capitalization requirements of the text string with the text string code types.

5 Claims, 4 Drawing Sheets

BINDCAP ACTION VALUES

(BIND/CAP)

|  | RIGHT TYPE CODE | | | | | | | |
|---|---|---|---|---|---|---|---|---|
| | | x | s | , | : | 1 | ( | w | S |
| LEFT CODE | x | -/- | -/- | -/- | -/- | -/- | -/- | -/- | -/- |
| | s | -/- | 0/- | 0/- | 0/- | 0/- | 0/- | 0/- | 0/C |
| | ( | -/- | 0/- | 0/- | 0/- | 0/- | 0/- | 0/- | 0/C |
| | 1 | -/- | 0/- | 0/- | 0/- | 0/- | 1/- | 1/- | 2/C |
| | , | -/- | 0/- | 0/- | 0/- | 1/- | 1/- | 1/- | 1/C |
| | w | -/- | 0/- | 0/- | 0/- | 1/- | 1/- | 1/- | 2/C |
| | : | -/- | 0/- | 0/- | 0/- | 2/- | 2/- | 2/- | 2/C |
| | S | -/- | 0/- | 0/- | 0/- | 2/- | 2/- | 2/C | 2/C |

METHOD AND APPARATUS FOR PROVIDING BINDING AND CAPITALIZATION IN STRUCTURED REPORT GENERATION

BACKGROUND OF THE INVENTION

The invention relates generally to structured report generation methods and apparatus, and in particular, to a method and apparatus for properly spacing and capitalizing words or phrases as they are inserted into a fixed document format, especially but not exclusively in conjunction with speech recognition.

The output of a speech recognition apparatus, words, phrases, or other speech strings or elements, is typically without either punctuation, capitalization or a recognition of the spacing between the elements. For example, the spacing between recognized words can vary in accordance with the context in which the words appear, and the decision whether to capitalize the initial letter of a word, for example, because the word appears at the beginning of a sentence, is typically not provided to the system. Accordingly, the output of a typical word speech recognition system is often a series of words or phrases in a format that does not follow standard punctuation or capitalization.

One particular application of a speech recognition system is to provide the text to be inserted into spaces or blocks left in a report form. This application, termed "structured report generation," allows a speaker to insert words or phrases into designated spaces of a report form. The application can also expand what is recognized by the recognition system so that if the recognized word is "normal," the text string inserted into the report is the sentence, "The heart is normal." The inserted words or phrases are often referred to as a "text string" and the space into which it is inserted is the "fill-in." More generally, a "text string" is a piece of text (which can be a word or a form with or without fill-ins) which is inserted as a block, generally as a result of a speech recognition process. The user, however, typically does not provide or indicate the spacing between the inserted word or phrase and the previous phrase, nor does the user indicate whether to capitalize the initial letter of a word which, for example, may begin a sentence.

Accordingly, absent further information, the system may provide a report which has incorrect word spacing (or "binding") and incorrect or no capitalization.

It is therefore an object of this invention to provide a method and apparatus for correctly spacing text strings inserted into a report form and for correctly determining whether to capitalize the initial letter of an inserted text string. Other objects of the invention are to provide such text binding and capitalization in a structured report generation system, to perform these tasks automatically and accurately, and to enable the system application to operate in real time.

SUMMARY OF THE INVENTION

The invention thus relates to a report generation method and apparatus for automatically binding and capitalizing text strings (words, parts of words, phrases, sentences, paragraphs, or forms which themselves include fill-ins) provided by a speech recognition system for a fill-in in a report form. The method features the steps of associating with each text string, text string electrical signals representing at least instructions for binding and capitalizing the text string; inserting spaces, if any are required, prior to the text string in response to the text string electrical signals, and capitalizing the text string when required in response to the text string electrical signals. The method further features the steps of automatically determining, in response to the instructions, the space and capitalization requirements of the text string. In addition, the method can review the previous text material and the fill-in itself to determine the spacing and capitalization requirements. The text string electrical signals also represent, in the preferred embodiment of the invention, a description of the text string as related to binding and capitalization.

The method, in a particular aspect of the invention, represents the description and instructions as a four-element sequence. The four-element sequence for each text string has a left code instruction, a right code instruction, a capitalization action instruction, and a spacing action instruction. If either the spacing or capitalization action instruction is unspecified, the method can access a stored table for determining the required capitalization and spacing for requirements for the text string, based upon text surrounding the inserted text string. Thus, the system can determine the spacing requirement for a new text string from the right instruction or code element of the sequence associated with the text string and the left instruction or code element of the sequence associated with at least one previous text string. Capitalization is also determined from the right instruction or code element associated with the text string and the left instruction or code element associated with at least one previous text element.

The apparatus of the invention features circuitry for associating with each text string, text string signals representing at least instructions for binding and capitalizing the text string, circuitry for inserting spaces, if any are needed, prior to the text string in response to the text string electrical signals, and circuitry for capitalizing the text string when required in response to the text string electrical signals. The apparatus further features circuitry for automatically determining, in response to the text string signals, the number of spaces and the capitalization requirements of the text string. The circuitry operates in response to the text material appearing prior to the text string and to the text string itself.

BRIEF DESCRIPTION OF THE DRAWINGS

Other objects, features, and advantages of the invention will be apparent from the following description taken together with the drawings in which.

DESCRIPTION OF A PREFERRED EMBODIMENT

Figure 1:
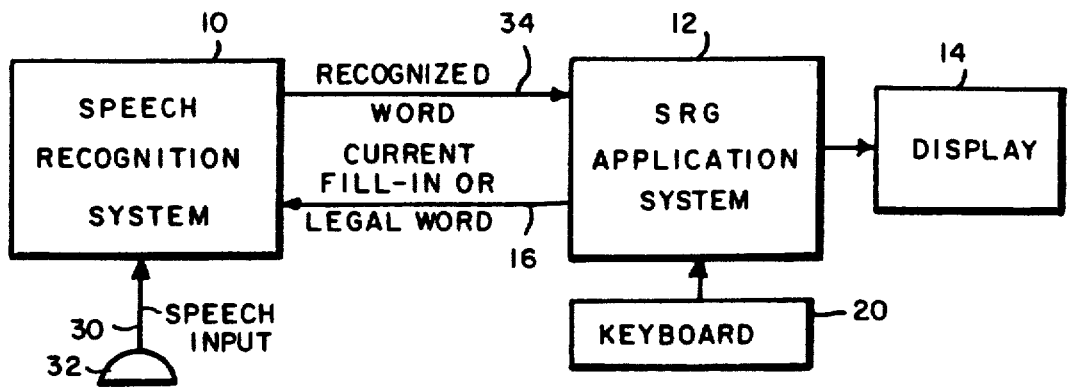
FIG. 1 is a general block diagram of a speech recognition system incorporating a structured report generation application in accordance with the invention.

Referring to FIG. 1, a speech recognition system 10 can be used with a structured report generation (SRG) application. An SRG application implementation system 12 is responsive to recognized words from the speech recognition system and places text that is a function of those words in a previously prepared form document or report. (The SRG application can also insert text strings from an input keyboard into the form report.) The form document 28 is displayed on a display monitor 14 and has the appearance illustrated in FIG. 2. For each "insert point" or fill-in 24, 26, . . . , in the form document, the SRG application system makes available over lines 16 to the recognition system, those words or phrases which are allowed or "legal" in the "insert point" or "fill-in." The recognition system, in response to a user speech input, makes the recognized word or phrase (a "text string") available over lines 34 and the SRG application system determines which text string is to be inserted (if any) and inserts the text string into the fill-in 24. A similar mechanism can operate using the keyboard as the input source.

The speech recognition system and the SRG application system can be constructed in either hardware, software, or a combination of two. The speech recognition system can use any of the available speech recognition methods known to those in the speech recognition arts, for example, that described in U.S. Pat. No. 4,799,262. Similarly, the SRG application system can be any of those applications, such as that sold by Kurzweil Applied Intelligence, Inc., under the trademark designation VoiceRad, which is employed for making the task of generating reports, for example in a medical environment, easier and more consistent. In the illustrated embodiment, the systems 10 and 12 are implemented primarily in software on a personal computer.

In typical operation, prior to speech recognition, the form of report is prepared using, for example, a keyboard 20 to input text and punctuation to the SRG application system. This is the Knowledge Base creation step. The keyboard input generates a set of reports which can take any form desired by the user. In a particular context, a report may have a form similar to that of FIG. 2.

Figure 2:
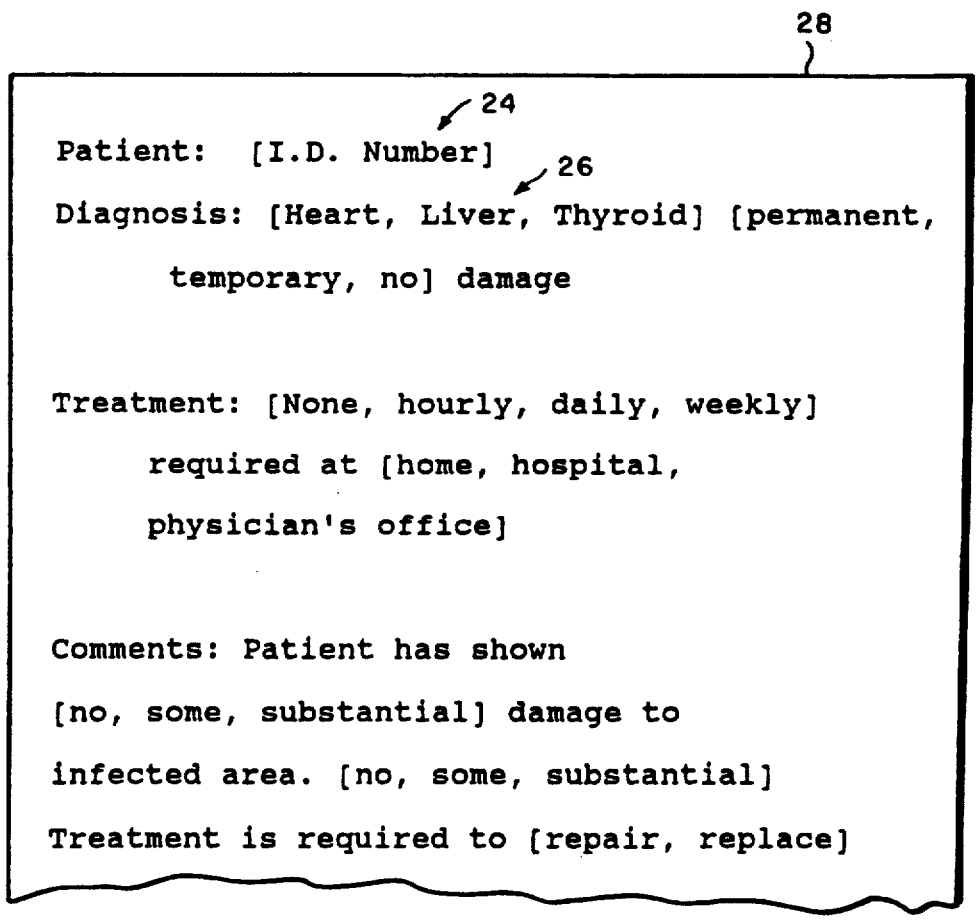
FIG. 2 is an illustrative representation of a portion of a structured report prior to completion.

Referring to FIG. 2, a typical report form 28 has a number of bracketed items or fill-ins 24, 26, . . . . Within the bracketed item, designated a "fill-in" or "insert point", there is either a single designation such as "I.D. Number" or a plurality of potential entries, such as "heart," "liver," and "thyroid," indicated at fill-ins 24 and 26 respectively of the document 28. With regard to the "I.D. Number" entry, the SRG application system will interpret the entry as requiring a plurality of numbers to be input at that fill-in and advises the speech recognition system, with signals over lines 16, that a series of numbers is to be recognized. Similarly, with regard to fill-in 26, the SRG application system provides to the speech recognition system signals representing the words "heart," "liver," or "thyroid." The speech recognition system then examines the incoming speech, over lines 30 from, for example, a microphone 32, for these words. The SRG application system, as it receives words over the recognized word lines 34, inserts the received information into the form, replacing the bracketed designation, until all of the fill-ins have been replaced. In a more advanced application system, the inserted text string may itself contain fill-ins so that, for example, saying the word "heart" at fill-in 26 may open up a separate form providing for a much more detailed diagnosis of the potential difficulties relating to the heart. Similarly, the term "liver" may open up a separate and different form which would be inserted at that fill-in and which would then provide the user with a much more detailed and flexible report relating to a liver diagnosis. Forms can be nested to any level (allowed by the application system).

The process of recognizing speech input is well known to those in the speech recognition field. However, in cases where the speech input is associated with text, in the process of placing such text into the document, the spacing between words of text which depend upon context, for example, between the form word "diagnosis:" and the text string represented by, for example, "liver" is not provided. Similarly, the system does not know a priori whether the first letter of a text string should be capitalized. It is to these problems that the invention is particularly directed.

The binding and capitalization methods each apply to the beginning of a text string. When spaces are inserted between a pair of adjacent text strings (the earlier text string may be generated by the speech recognition system or previously entered by, for example, using the keyboard), they are actually prepended to the characters of the second (later occurring) of the two strings. Similarly, it is the first alphabetic character of a text string that is capitalized when appropriate.

In accordance with the invention, there is associated with each text string of a document a left and a right type code or instruction. These codes or instructions describe the characteristics of the text with which they are associated. For each text string, the left type code for the string describes the relevant characteristics of that string when it is the left element of a pair of text strings. Similarly, the right type code describes the characteristics of the string when it is the right element of a pair of text strings. Therefore, a left type code describes the ending of a text string and a right type code describes the beginning of a next text string. Given that each type code specifies only one end of a string, and that each text string has two type codes, the codes themselves may describe very different characteristics.

In the illustrated embodiment of the invention, the left and right codes or instructions are organized into a four-position code sequence, designated "ABCD," which indicates how the spacing and capitalization are to function in a specific text string. Each text string thus has an "ABCD" code sequence associated with it. The "A" and "B" positions of the code are the type codes or instructions. They indicate the type of boundaries that the system will find at the beginning and ending of the text string. Position "A" describes the ending boundary and position "B" describes the beginning boundary of the text. "A" is thus the left code type and "B" is the right code type.

Positions "C" and "D" are the action codes. They indicate the action to be taken, if any, in modifying a text string for capitalization and for prepending a number of spaces to the text for spacing relative to the previous text string. Position "C" is for capitalization and position "D" indicates the number of binding spaces. These action elements can be determined as described below, in accordance with the table of FIG. 3, and subject to the rules specified below.

In the illustrated embodiment of the invention, the following type codes are employed to describe the beginning and ending of a text string:

| Code Value | Meaning |
| --- | --- |
| ? | Type code value not yet specified: determine the proper value of the type code, as described hereinafter, before proceeding. |
| x | Set any action code, as defined hereinafter, determined from this type code to "—" (that is, do not adjust either capitalization or spacing depending upon the action to which the "—" refers. This value overrides any other value specified by the other type code of a code pair (as explained hereafter). |
| s | The corresponding string end is like a space character. |
| , | The corresponding string end is like a comma or similar punctuation mark. |
| ( | The corresponding string end is like an open parenthesis character. |
| : | The corresponding string end is like a colon. |
| 1 | The corresponding string end is like a digit or string of digits. |
| w | The corresponding string end is like a normal letter or word. |
| S | The end of the corresponding string should be considered to occur at a sentence boundary: the ending of the sentence, if a left type code, and the beginning of a sentence, if a right type code. |

Figures 3, 4:
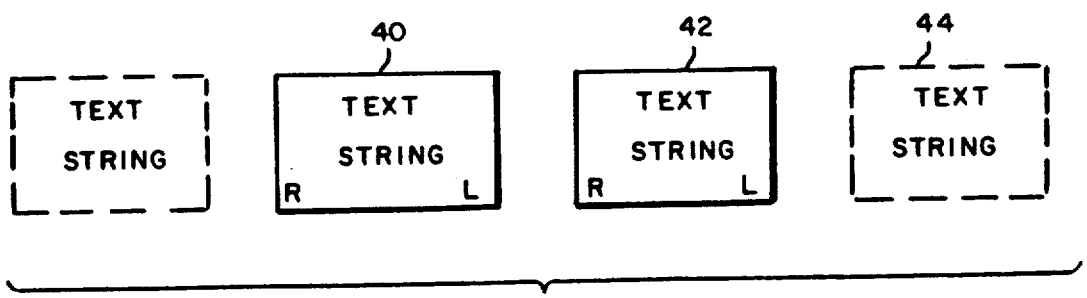
FIG. 3 is a table identifying actions associated with left and right code type instructions.
FIG. 4 is a diagram illustrating the relationship of the code values and the text strings with which they are associated.

Once the values of the right and left type codes or instructions are determined, the value of an action code for a text string is specified, subject to certain overriding rules, by a table stored in a memory of the SRG application system. The action/code value table, referring to FIG. 3, provides for each left and right type code value pair, the action to be taken with regard to binding or prepending spaces to a text string, as well as the action to be taken with regard to capitalization of the text string. In referring to FIG. 3, a "—" indicates that no modification of the text string is to be taken; a number "0," "1" or "2" indicates that 0, 1 or 2 spaces should be prepended to the text string; and a "C" indicates that the initial letter of the text string should be capitalized.

The left and right type action code values used in FIG. 3 are determined as illustrated in FIG. 4. Referring to FIG. 4, a text string 40, a text string 42, and a text string 44 are illustrated adjacent to each other as they would appear in a printed report. The letters "L" and "R" represent the left and right code values, respectively, of these various text strings. Assuming that text strings 40, 42, and 44 are inserted in that order, and, with reference to the binding between text strings 40 and 42, the left code value of text string 40 and the right code value of text string 42 are used to determine the resulting spacing action instruction and the action for capitalization for string 42. Similarly, the left and right code values of text strings 42 and 44, respectively, determine the action for the spacing (binding) and capitalization of the string 44.

An action code can be determined by the system, as noted below, when the code is set to a "?". When an action code is set to a "—", the text is not adjusted and is used as it exists. Thus, for example, an "ABCD" code of "SS??" for a text string indicates that the text string both starts and ends like a sentence. The method of the invention can then use the table of FIG. 3 to determine the number of binding spaces to prepend to the new text string and whether to capitalize the text string. As noted from FIG. 3, zero, one, or two spaces are prepended to the right hand text string, depending upon the left code values for the previous text and the initial letter of the first word is almost always capitalized.

As another example, the "ABCD" code might be "w???". This code indicates to the next sequential text that the text preceding it ends with a word.

In determining the values of the left and right type codes or instructions for a text string, the following rules are employed in the illustrated embodiment of the invention:

1. If there is no text string in the document, then the left type code for a "pseudo text string" which can be used with the first inserted text string is assumed to be "S" (that is, the left context is like an end of sentence).

2. If there is no previous text string in the current fill-in, then the left type code associated with the fill-in is employed.

3. The left and right type codes associated with each text string to be inserted is set to "?" before insertion.

4. Fill-in type code values must be specified when the Knowledge Base is created as part of the fill-in attributes. The left type code of a fill-in describes the report text immediately preceding the fill-in. The right type code of a fill-in is not used.

5. The action associated with the speech or keyboard input can override the codes associated with a text string to be inserted.

6. If the left and right type codes are not "?", then they are used as indices into the table of FIG. 3 to directly determine the appropriate action codes. If either of the codes are a "?", then the following rules apply to determine the values to be assigned to them.

7. (a) If the text string is empty, then both type codes are "s".

(b) Otherwise, the left type code is determined by the value of the final character in the text string according to the following table:

| Final Character Value | Left Type Code |
| --- | --- |
| a-z A-Z & | w |
| 0-9 | 1 |
| . ? ! | S |
| , ; ) ] } | , |
| : | : |
| " " ' $ ( [ { | ( |
| anything else | s |

(c) The right type code is determined by the value of the first character in the text string, as follows:

| First Character Value | Right Type Code |
| --- | --- |
| a-z A-Z & | w |
| 0-9 | 1 |
| , ; ) ] } . ? ! | , |
| : | : |
| " ' ( [ { | ( |
| anything else | s |

The value of the action codes, according to the invention, can be specified in several ways. In accordance with the preferred embodiment of the invention the following rules apply:

1. The action codes are initialized to "?" before each new input text string is processed.

2. The action associated with the speech or keyboard input can be directly set as part of the system's response to recognizing a particular word. In that case, the set values completely determine the action to be taken. Otherwise, the following rule will apply.

3. The action code is determined from the values of the left type code of the previous text string and the right type code of the text string in accordance with the table of FIG. 3.

In the illustrated embodiment of the invention, the rules described above are invoked only under certain circumstances. The capitalization method is only applied to text strings whose initial character is a lower case alphabetic character, that is, "a" through "z".

Figure 5:
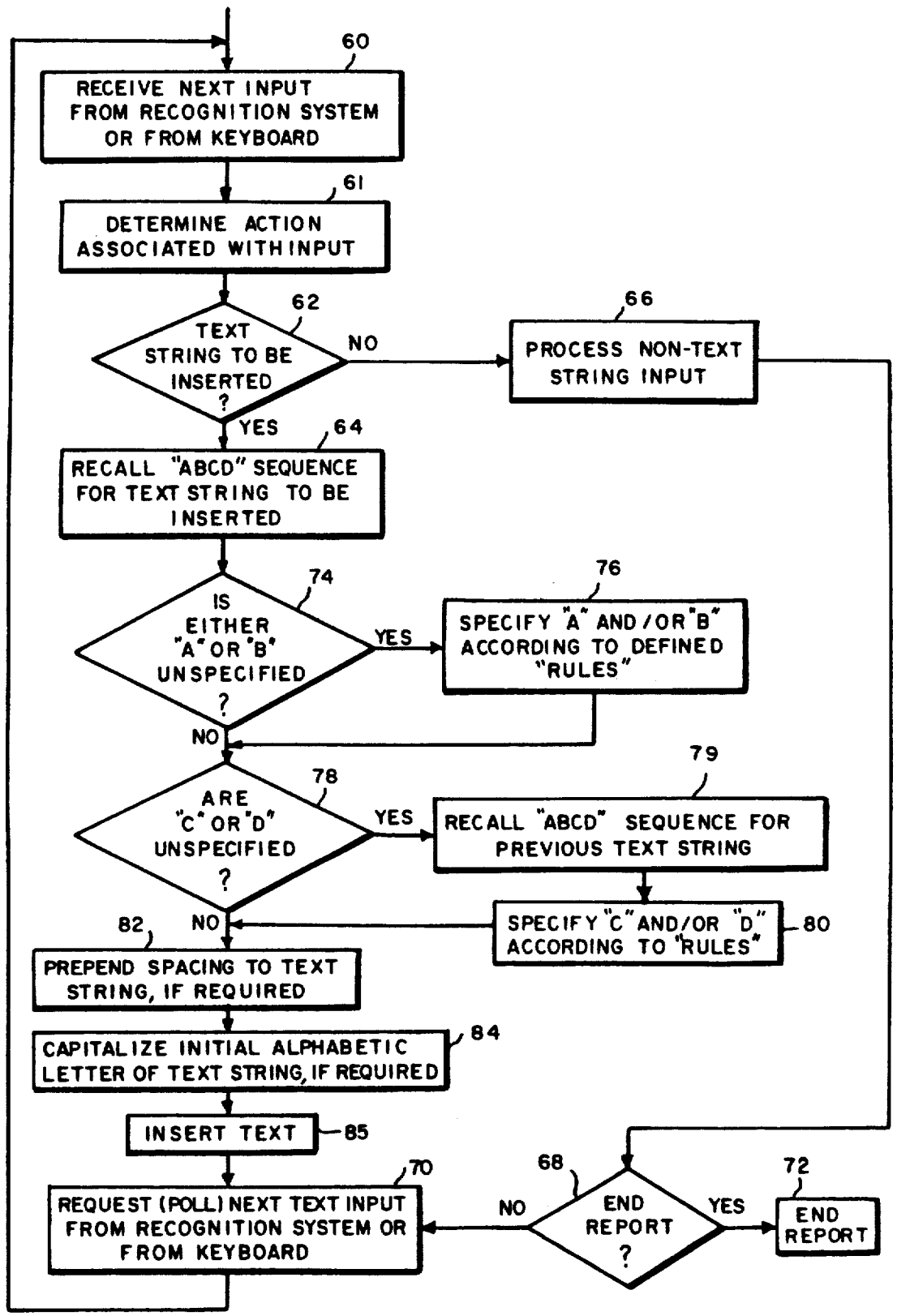
FIG. 5 is a general flow diagram of the binding and capitalization method in accordance with the invention.

Referring now to FIG. 5, in typical operation of the system according to the invention, the apparatus receives, at 60, input from the speech recognition system 10 or the keyboard 20. The apparatus determines, at 61, what action is associated with the input, and then checks, at 62, to determine whether that action inserts a text string. If it inserts a text string, then the "ABCD" sequence for that text string is recalled at 64. If the input does not insert text, it is processed at 66. Next, at 68, the system determines whether a request to end the input was issued. If it was, the report processing is ended at 72. Otherwise, the system polls, at 70, for input.

Referring back to step 64, after the "ABCD" sequence has been obtained for the text string to be inserted into the document, the system checks, at 74, to determine whether either the "A" or the "B" code values are unspecified for that text string (that is, contain a "?"). If either value is not specified, it is determined, at 76, according to the rules defined above. Thereafter, the "C" and "D" values are checked at 78 and if either is unspecified, the "ABCD" sequence for the previous string is recalled, at 79, the "C" and/or "D" value is specified, at 80, according to the rules detailed above and referred to in connection with FIG. 6. Thereafter, any spaces which need to be prepended to the text string are added at 82 and capitalization takes place, if required, at 84. The text string is then inserted, at 85, after which the system polls, at 70, for more speech or keyboard input.

Figure 6:
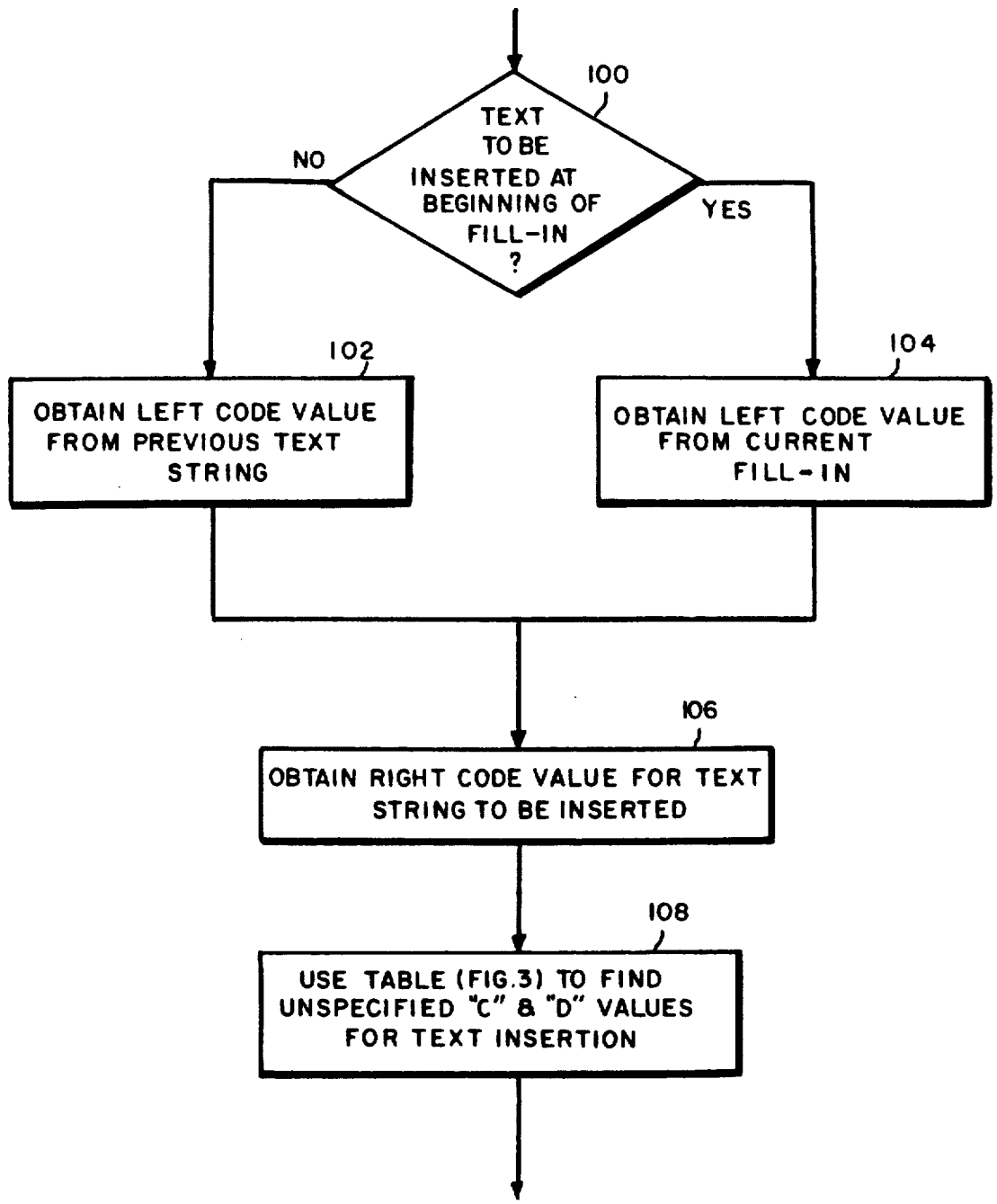
FIG. 6 is a more detailed flow chart of a particular aspect of the method of operation in accordance with the invention.

Referring now to FIG. 6, which expands upon step 80 of FIG. 5, the system, if the "C" and "D" values are not already set, first checks, at 100, whether the text string is to be inserted at the beginning of a fill-in. If it is, the system obtains, at 104, the left code value from the current fill-in. Otherwise, the system obtains, at 102, the left code from the previous text string. The system then obtains, at 106, the right code value for the text string to be inserted. Using a table (FIG. 3) at 108, the system determines the "C" and "D" codes for this text insertion.

Accordingly, therefore, there is associated with each text string in the report a left and a right code value and a capitalization and a spacing action code. In this manner, operating in accordance with the instructions noted herein, the capitalization and spacing of a new input text string can be properly set with the result being a properly capitalized and spaced report which does not need additional punctuation changes. Since the spaces are prepended to the inserted text string, if the text string is later deleted, the prepended spaces are deleted automatically.

Additions, subtractions, deletions and other modifications of the invention will be apparent to those practiced in the art and are within the scope of the following claims.

What is claimed is:

1. A report generation method utilizing a structured report form providing successive preselected text strings interspersed with insert points at which any one of a plurality of insert text strings may be inserted, each of said text string comprising a succession of characters and having a start and an end, said method comprising:

providing in association with each of said preselected and insert text strings a first code instruction which characterizes the start of the text string and a second code instruction which characterizes the end of the text string;

generating a report by progressing through said report form preselected text strings successively and, as successive insert points are encountered, providing to a user input system an indication of acceptable insert text strings;

responsive to input provided by a user to said input system, selecting at least one of said acceptable insert text strings;

prepending to the selected insert text string a number of blank spaces determined as a function of the respective first code instruction associated with the selected insert text string and the respective second code instruction associated with the text string which precedes the respective insert point in the report being assembled; and determining the capitalization of the initial character of the selected insert text string determined as a function of the respective first code instruction associated with the selected insert text string and the respective second code instruction associated with the preceding text string in the report being assembled.

2. The method of claim 1 wherein said prepending and determining of capitalization steps each further comprise the steps of accessing a stored table for determining the capitalization and space prepending for the text string being inserted.

3. The method as set forth in claim 1 wherein said input system is a speech recognizer which responds to the speech of a user.

4. The method as set forth in claim 1 in which acceptable text strings to be inserted themselves contain insert points for other insert text strings.

5. A report generation method utilizing a structured report form providing successive preselected text string interspersed with insert points at which any one of a plurality of insert text strings may be inserted, each of said text strings comprising a succession of characters and having a start and an end, said method comprising:

providing in association with each of said preselected and insert text strings a first code instruction which characterizes the start of the text string; a second code instruction which characterizes the end of the text string; a capitalization action instruction; and a spacing action instruction;

generating a report by progressing through said report form preselected text strings successively and, as successive insert points are encountered, providing to a speech recognition system an indication of acceptable insert text strings;

responsive to speech input provided by a user to said speech recognition system, selecting at least one of said acceptable insert text strings;

if permitted by said spacing action instruction, prepending to the selected insert text string a number of blank spaces determined as a function of the respective first code instruction associated with the selected inset text string and the respective second code instruction associated with the text string which precedes the respective insert point in the report being assembled; and if permitted by said capitalization action instruction, determining the capitalization of the initial character of the selected insert text string determined as a function of the respective first code instruction associated with the selected insert text string and the respective second code instruction associated with the text string which precedes the respective insert point in the report being assembled.

* * * * *